(12) United States Patent
McCormick et al.

(10) Patent No.: US 8,857,081 B2
(45) Date of Patent: Oct. 14, 2014

(54) QUICK HITCH COUPLER

(76) Inventors: Patrick McCormick, Oldcastle (IE);
Caroline McCormick, Oldcastle (IE);
Lorna McCormick, Oldcastle (IE);
Martin Segarty, Oldcastle (IE);
William Egenton, Oldcastle (IE)

(*) Notice: Subject to any disclaimer, the term of this patent is extended or adjusted under 35 U.S.C. 154(b) by 0 days.

(21) Appl. No.: 13/461,554

(22) Filed: May 1, 2012

(65) Prior Publication Data
US 2012/0210614 A1 Aug. 23, 2012

(51) Int. Cl.
*E02F 3/96* (2006.01)
*E02F 3/36* (2006.01)

(52) U.S. Cl.
CPC ............ *E02F 3/3618* (2013.01); *E02F 3/365* (2013.01); *E02F 3/3622* (2013.01)
USPC .............. 37/468; 414/723; 172/272; 403/315

(58) Field of Classification Search
CPC ........ E02F 3/3663; E02F 3/365; E02F 3/3622
USPC ........... 172/272; 414/723; 403/315, 316, 319, 403/330; 37/468
See application file for complete search history.

(56) References Cited

U.S. PATENT DOCUMENTS

| | | | |
|---|---|---|---|
| 5,082,389 A * | 1/1992 | Balemi | 403/322.3 |
| 5,147,173 A * | 9/1992 | Fauber et al. | 414/723 |
| 5,179,794 A * | 1/1993 | Ballinger | 37/468 |
| 5,692,325 A * | 12/1997 | Kuzutani | 37/468 |
| 6,058,633 A * | 5/2000 | Barden | 37/468 |
| 6,139,212 A * | 10/2000 | Heiple | 403/322.1 |
| 6,254,331 B1 * | 7/2001 | Pisco et al. | 414/723 |
| 6,301,811 B1 * | 10/2001 | Gilmore, Jr. | 37/468 |
| 6,379,075 B1 * | 4/2002 | Shamblin et al. | 403/322.1 |
| 6,508,616 B2 * | 1/2003 | Hung | 414/723 |
| 6,625,909 B1 * | 9/2003 | Miller et al. | 37/468 |
| 6,699,001 B2 * | 3/2004 | Fatemi | 414/723 |
| 6,964,122 B2 * | 11/2005 | Cunningham et al. | 37/468 |
| 7,306,395 B2 * | 12/2007 | Fatemi | 403/321 |
| 7,493,712 B2 * | 2/2009 | McCormick et al. | 37/468 |
| 7,984,576 B2 * | 7/2011 | Miller et al. | 37/468 |
| 8,151,494 B2 | 4/2012 | Scheib | |

(Continued)

FOREIGN PATENT DOCUMENTS

| | | |
|---|---|---|
| FR | 2914932 | 4/2007 |
| GB | 2330569 | 4/1999 |
| GB | 2330569 A | 4/1999 |
| GB | 2446138 | 6/2008 |
| GB | 2446138 A | 8/2008 |
| WO | WO 2008031590 | 3/2008 |

*Primary Examiner* — Thomas B Will
*Assistant Examiner* — Joel F. Mitchell
(74) *Attorney, Agent, or Firm* — Edwin Tarver; Lauson & Tarver, LLP

(57) ABSTRACT

A quick hitch coupler having an arrangement for releasably coupling a tool such as an excavator tool to the quick hitch coupler. The arrangement for releasably coupling the tool to the quick hitch coupler has tool pin engaging members on spaced apart portions of the main body of the quick hitch coupler. One of the tool pin engaging members has an associated latching member movably mounted on the main body of the quick hitch coupler between a tool pin locking position and a tool pin releasing position. The latching member has a lock movably mounted on the latching member for locking a tool pin onto the latching member quick hitch coupler in normal use.

17 Claims, 20 Drawing Sheets

(56) References Cited

U.S. PATENT DOCUMENTS

| | | |
|---|---|---|
| 2002/0071754 A1 | 6/2002 | Fatemi |
| 2002/0176772 A1 | 11/2002 | Hung |
| 2005/0169703 A1 | 8/2005 | Fatemi |
| 2009/0249661 A1 | 10/2009 | Daraie |
| 2010/0172732 A1 * | 7/2010 | Daraie et al. .................. 414/723 |

* cited by examiner

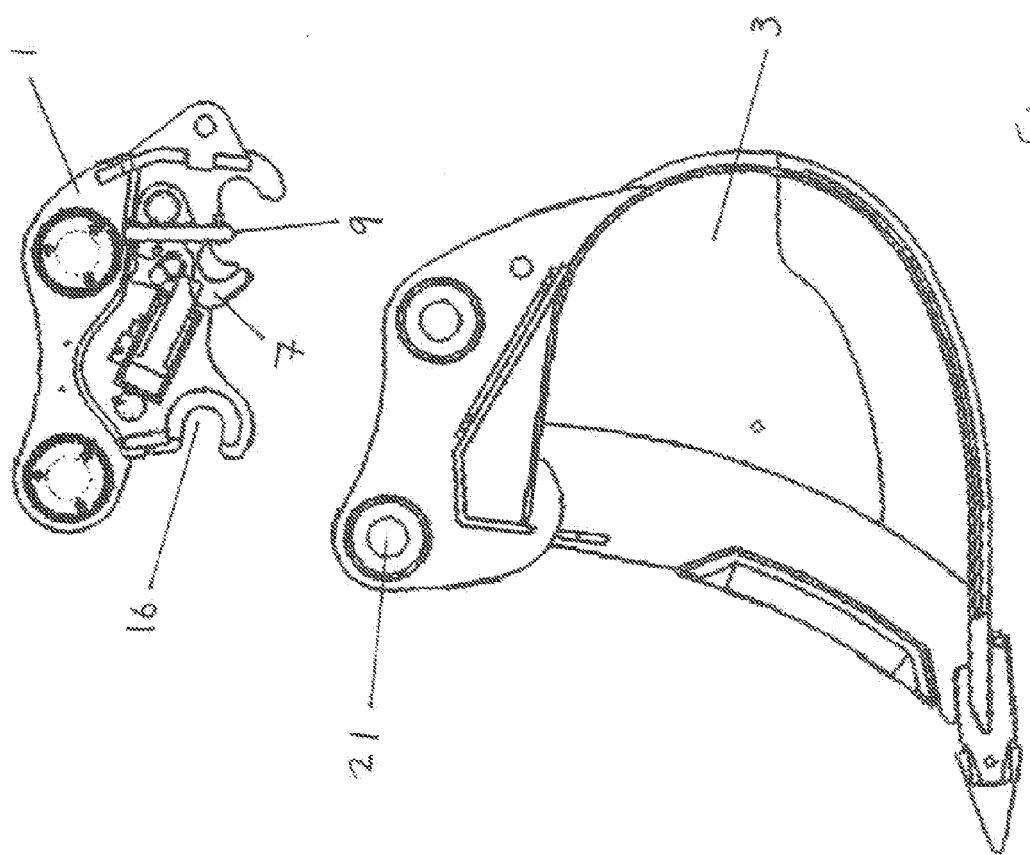

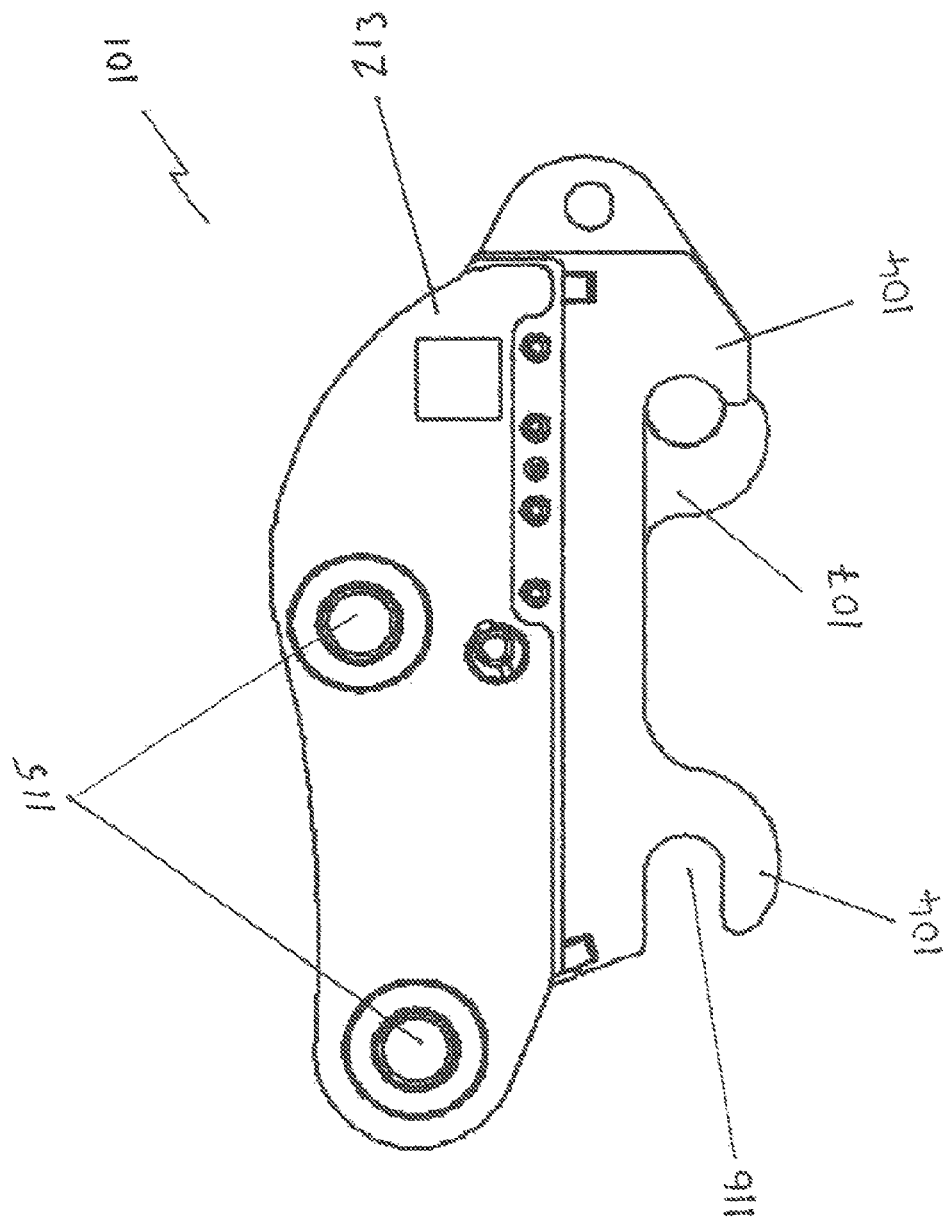

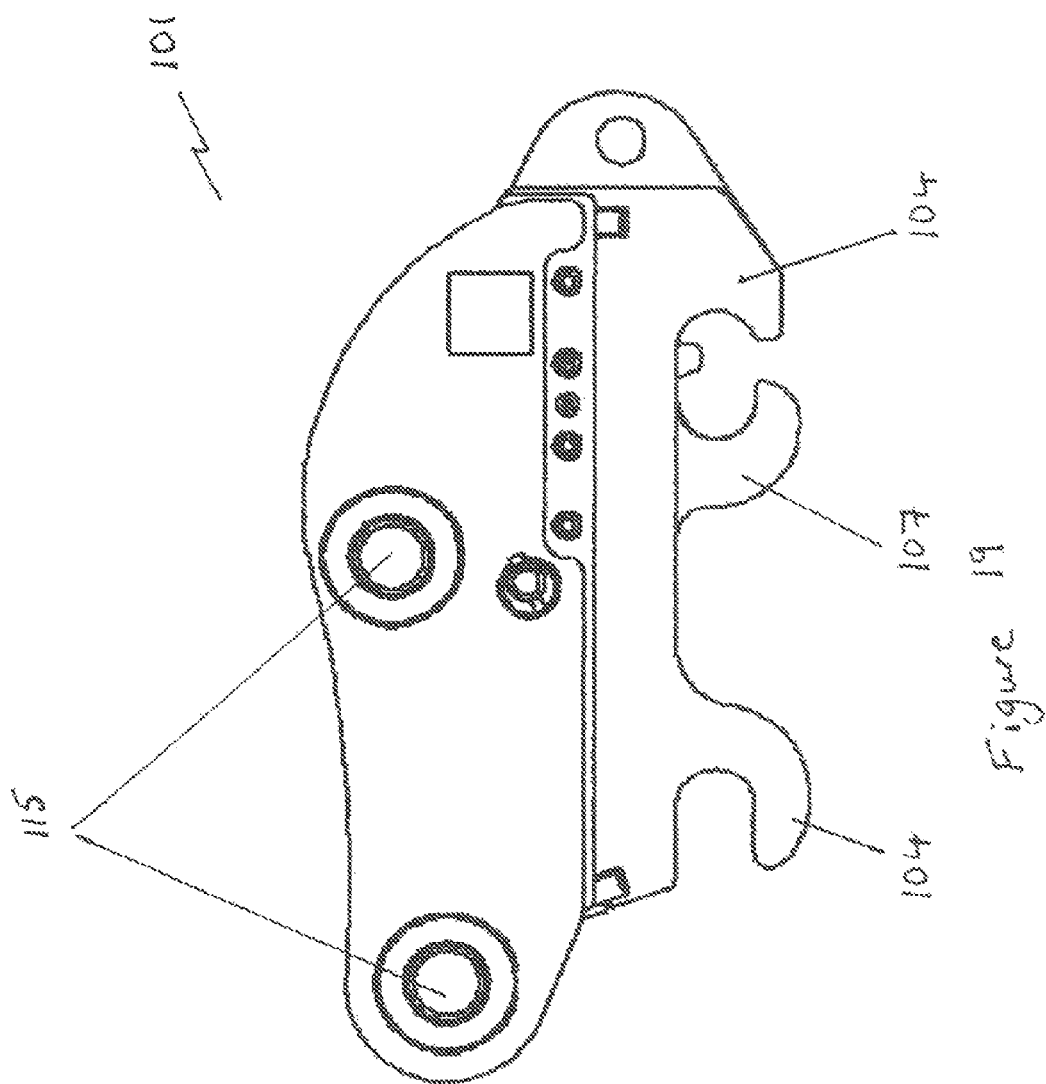

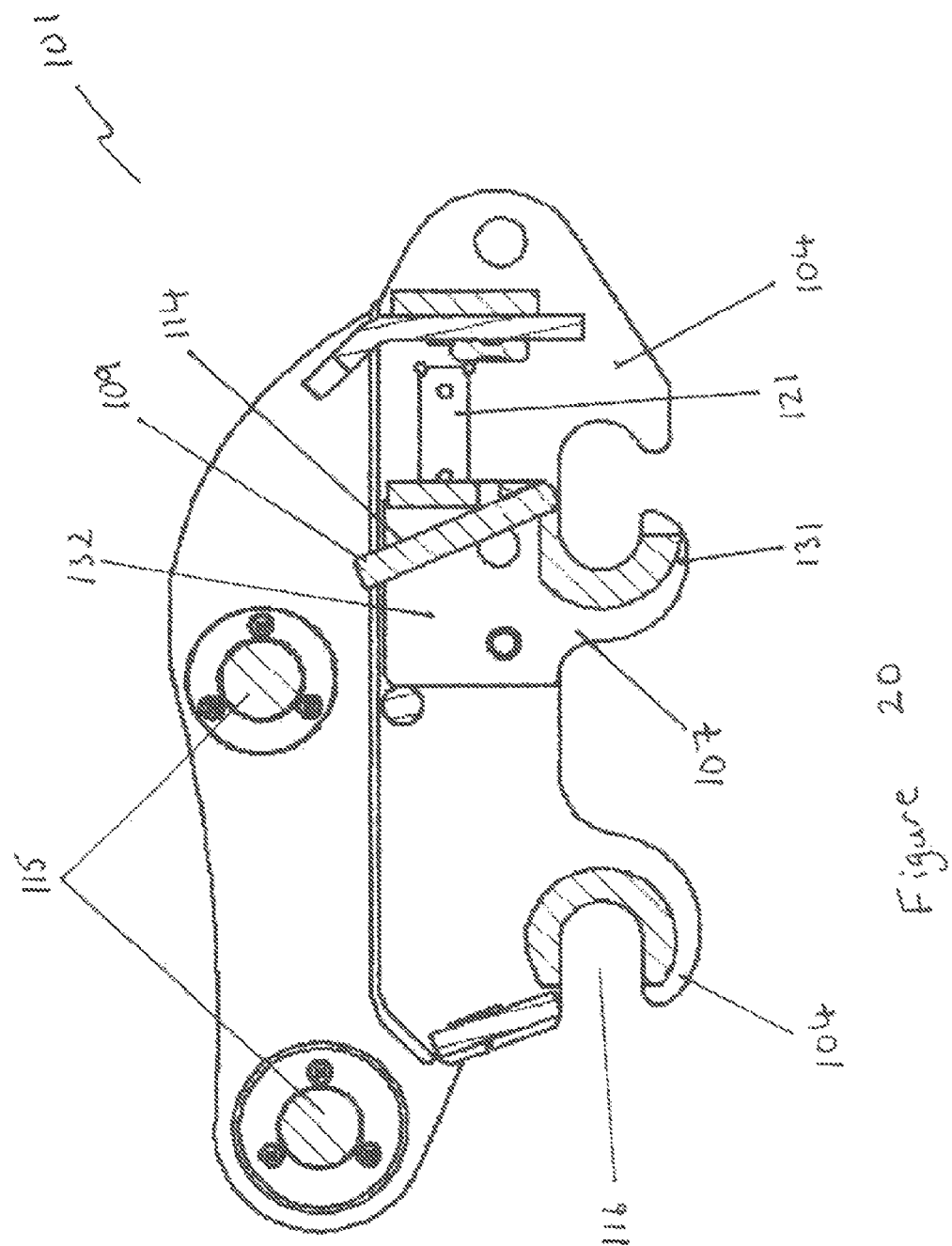

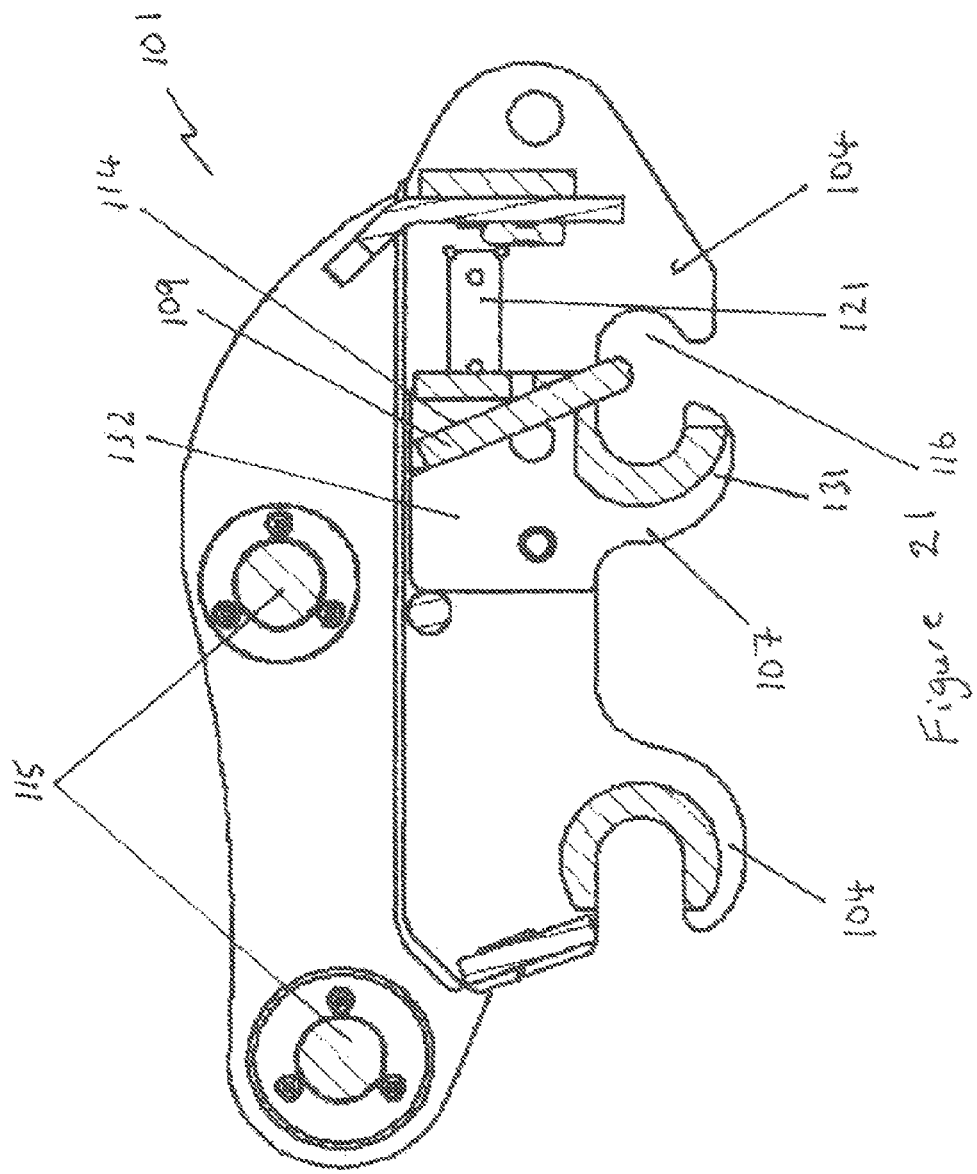

US 8,857,081 B2

QUICK HITCH COUPLER

PRIORITY CLAIM

This application claims the benefit of the priority filing date of international application number PCT/IB2010/054961, filed on Nov. 2, 2010, which in turn claims the benefit of the priority filing date of United Kingdom application number GB 0919169.3, filed on Nov. 2, 2009.

BACKGROUND

The present invention relates to a quick hitch coupler for attachment to the mechanical hoe arm of a machine.

Quick hitch couplers facilitate the rapid change over of excavator tools/attachments in an efficient manner. Conventional tool change over's can take up to two people and can take twenty minutes. A quick hitch coupler can complete a change over in less than two minutes and can be completed by the excavator operator alone. The coupler is attached to the excavator arm where it remains continuously in place. The lower half of the coupler includes a front jaw as seen from the excavator cab so as to facilitate the gripping of the tool pin. The back area of the bottom half of the coupler as seen from the excavator cab includes a movable jaw acting as latching hooks that is generally operated by a hydraulic cylinder. The coupling of the tool or other attachment is possible by the action of placing the front jaw in one tool pin and the movable latching hooks acted on by the hydraulic cylinder grip the other pin of the tool. The tool is attached to the excavator via the quick hitch coupler. The hydraulic cylinder is activated by the excavator operator inside the cab. If the operator activates the hydraulic cylinder without having any safety feature in place and without the tool placed in a safe drop off location, it is possible that the tool may fall and cause damage, injury or death.

A semi-automatic coupler has been developed to provide a form of safety such that accidental release of the tool is not possible. In many cases the safety feature is a mechanical blocking pin inserted behind the latching hook assembly after the tool is coupled. When the safety pin is installed it is not physically possible for the hydraulic cylinder to retract, consequently holding the latching hook in situ. The tool is held in place and drop off is not possible. When tool drop off is required and intentional, the operator demounts the cab and the safety pin is removed and decoupling of the tool is now possible. The semi-automatic coupler has the problem that human intervention is required to activate the safety system. In other words, the operator has to demount the cab and physically insert the safety pin. Research and spot checks have shown that this procedure is often not complied with so to counteract this weakness in the device, a fully automatic system is used. At the instance of coupling a tool, the safety system is activated automatically. Drop off of the tool is not possible unless a predefined process and sequence of events is followed.

Accordingly, the present invention provides a quick hitch coupler having means for releasably coupling a tool to the quick hitch coupler, the means for releasably coupling a tool to the quick hitch coupler comprising tool pin engaging means on spaced apart portions of a main body of the quick hitch coupler, one tool pin engaging means having an associated latching means movably mounted on the main body of the quick hitch coupler between a tool pin locking position and a tool pin releasing position, the latching means having a locking means movably mounted on the latching means for securing a tool pin onto the latching means.

SUMMARY

In one embodiment, the locking means is gravity operated. Alternatively, the locking means is hydraulically, pneumatically, electrically, electronically or wirelessly operated.

Ideally, the latching means and the locking means interact to secure a tool pin onto the latching means of the quick hitch coupler.

Preferably, the latching means has means for guiding movement of the locking means.

Ideally, the latching means has a through bore or slot for guiding movement of the locking means.

Preferably, one end of the locking means protrudes out of the latching means defining a gap between the locking means and the latching means, the gap being formed for receiving a tool pin onto the quick hitch coupler between the locking means and the latching means.

Ideally, the quick hitch coupler has means for releasably mounting the quick hitch coupler to the mechanical hoe arm of an excavator.

Preferably, the main body of the quick hitch coupler has a part formed for engaging tool pins and a part formed for engaging a mechanical hoe arm.

Preferably, the tool pin engaging means define tool pin receiving apertures.

Preferably, the tool pin receiving apertures are facing in the same direction.

Ideally, the latching means comprises a barrier means movably mounted on the main body of the quick hitch coupler for locking the tool pin in one of the tool pin receiving apertures and motive means coupled between the main body of the quick hitch coupler and the barrier means for moving the barrier means between a tool pin locking position and a tool pin releasing position.

Preferably, the barrier means is provided by a latching hook moveable between a tool pin locking position and a tool pin releasing position.

Ideally, motive means are mounted between the latching means and the main body.

Ideally, the motive means is a hydraulic cylinder. Advantageously, the hydraulic cylinder is operable by the machine operator from the cab of the excavator.

Preferably, the latching hook has a through bore or slot for guiding movement of the locking means.

Preferably, the locking means normally rests in a tool pin locking position.

Preferably, the locking means rests in a tool pin releasing position when the quick hitch coupler is in the fully crowded position. This fully crowded position is widely accepted in the industry as a safe position for decoupling a tool from a quick hitch coupler of an excavator. The position occurs when the mechanical hoe arm brings the tool in as close to the body of the excavator as the mechanical linkages will allow and the hydraulic cylinders of the mechanical hoe arm coupled to the quick hitch coupler are in the fully extended position leaving the tool in an upside down configuration.

Preferably, the locking means comprises a locking member movably mounted in the through bore or slot of the latching means.

Ideally, one end of the locking means is extendable out of the through bore or slot of the latching means in front of the barrier means. In use, the extendable end of the locking means is moved in the through bore or slot of the latching means by contact with a tool pin during actuation of the latching means to accommodate locking of the tool pin onto the quick hitch coupler.

Preferably, one or both ends of the locking means has catch means for preventing the locking means falling out of the through bore or slot of the latching means.

Ideally, the catch means is provided by one or more dowel pins on one or both ends of the locking means for preventing the locking means from falling out of the through bore or slot.

Ideally, the locking means is movable within the through bore or slot of the latching means by an applied contact force. Advantageously, this allows the locking means to be moved from the pin locking position to the pin releasing position and back to the pin locking position when the barrier means is moved towards one of the tool pins of a tool located in the tool pin receiving apertures of the quick hitch coupler when any tool is initially coupled to the quick hitch coupler.

Preferably, the locking member comprises a block plate. Advantageously, the block plate is slidably mounted in the through bore or slot of the latching means.

It will of course be appreciated that the weight and strength of the locking means is dependent upon the size and function of the quick hitch coupler and can be varied to suit the specific requirements of the quick hitch coupler.

In the event of an accidental activation of the latching means from the tool locking position, a tool pin will remain clamped between the locking means and the latching means. The centre of the leading edge tool pin will not pass beyond the leading edge of the tool pin engaging member. The travel of the hydraulic cylinder is less than the distance between the centre of the leading edge pin and the leading edge of the tool pin engaging member.

Ideally, engagement means are provided on the main body of the quick hitch coupler for preventing the locking means from moving to the tool pin releasing position when the mechanical hoe arm is fully extended. The fully extended position of the mechanical hoe arm is the position the mechanical hoe arm will hold a tool in when the mechanical hoe arm and hydraulic rams acting between the mechanical hoe arm and the quick hitch coupler are at one limit of their range of movements. The mechanical hoe arm and hydraulic rams acting between the mechanical hoe arm and the quick hitch coupler are at their second limit of their range of movements when the tool is at the fully crowded position.

Alternatively, the engagement means is provided by a blocking member movably mounted on the main body of the quick hitch coupler so as to retain the locking means in the tool pin locking position when the mechanical hoe arm is in the fully extended position.

Ideally, the blocking member has one end formed for engaging the locking means and a second end pivotally mounted onto the main body of the quick hitch coupler.

Preferably, the engagement means has biasing means operably engaged with the blocking member to hold the blocking member in a position to retain the locking means in the tool pin locking position when the mechanical hoe arm is in the fully extended position.

Ideally, the biasing means temporarily engages the mechanical hoe arm to retain the blocking member in a position to retain the locking means in the tool pin locking position.

Alternatively, a biasing means is provided for direct or indirect operable engagement with the locking means. Advantageously, this removes the requirement for engagement means.

In a first embodiment, the latching means is pivotally mounted onto the main body of the quick hitch coupler.

In a second embodiment, the latching means is movable linearly along the main body of the quick hitch coupler between a tool pin locking position and a tool pin releasing position.

In the second embodiment, the latching means is slidably mounted on track means to guide the linear movement of the latching means.

In the second embodiment, the track means is provided by at least one track member mounted on the main body of the quick hitch coupler.

In the second embodiment, the track member is provided by a block of material having a quadrangular cross section.

In the second embodiment, the latching means is provided by a latching hook having a main body with means for interacting with the track means.

In the second embodiment, the means for interacting with the track means is provided by at least one through bore or slot extending through the latching hook main body.

The invention will now be described with reference to the accompanying drawings which show by way of example only one embodiment of a quick hitch coupler in accordance with the invention.

BRIEF DESCRIPTION OF THE FIGURES

FIG. 15 is a schematic drawing of the quick hitch coupler with a tool attached and the gravity operated locking arrangement in a tool pin locking position with the latching arrangement in a tool releasing position with the tool partially decoupled.

FIG. 18 is a schematic drawing of a second embodiment of quick hitch coupler in a tool pin locking position.

FIG. 19 is a schematic drawing of a second embodiment of quick hitch coupler in a tool pin releasing position.

FIG. 20 is a vertical sectional view of the second embodiment of quick hitch coupler of FIGS. 18 and 19.

FIG. 21 is a second vertical sectional view of the second embodiment of quick hitch coupler of FIGS. 18 and 19.

DESCRIPTION

Figure 1:
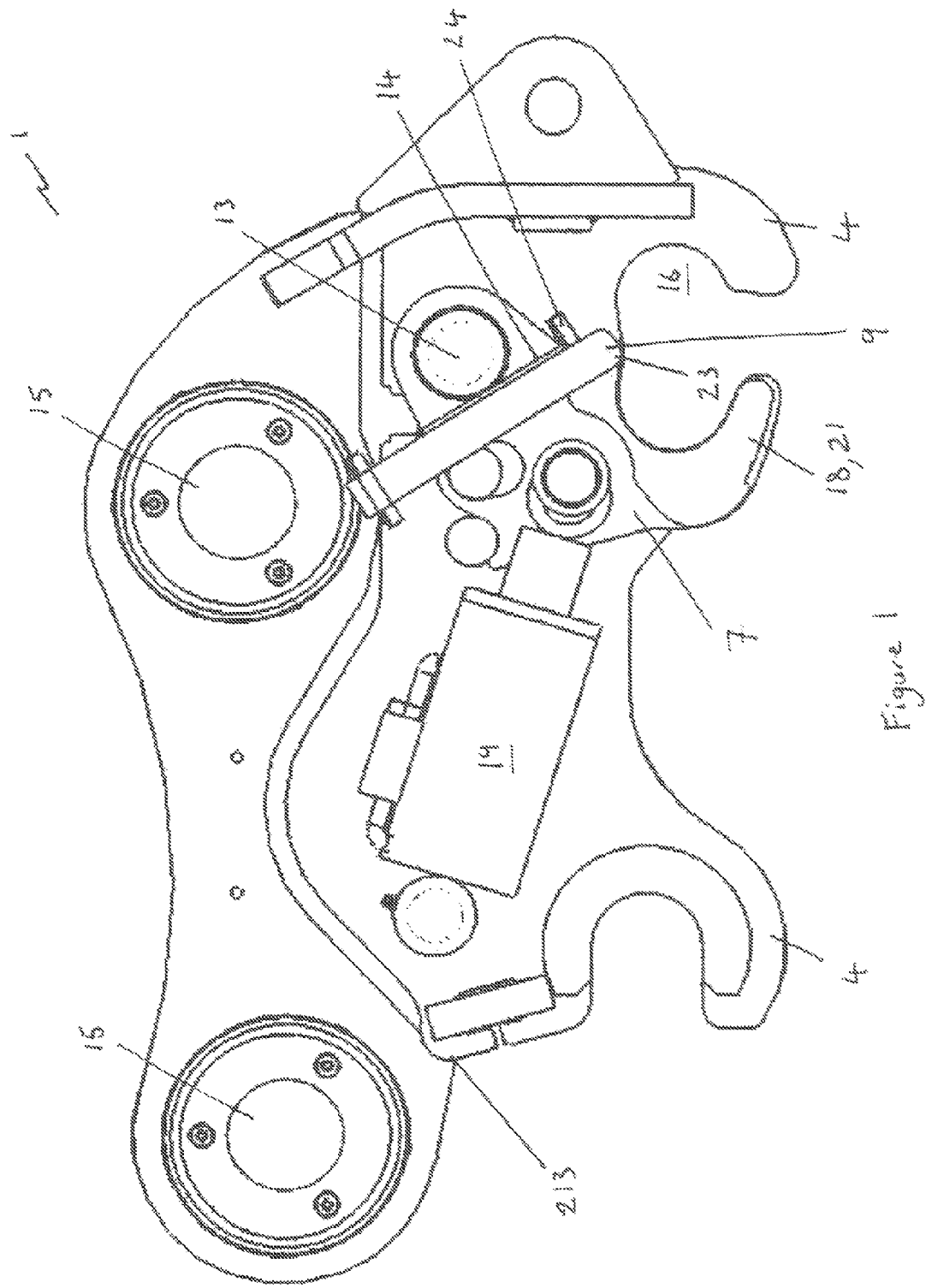
FIG. 1 is a schematic drawing of a quick hitch coupler with a gravity operated locking arrangement in a tool pin releasing position with the latching arrangement in a tool locking position.
Figure 2:
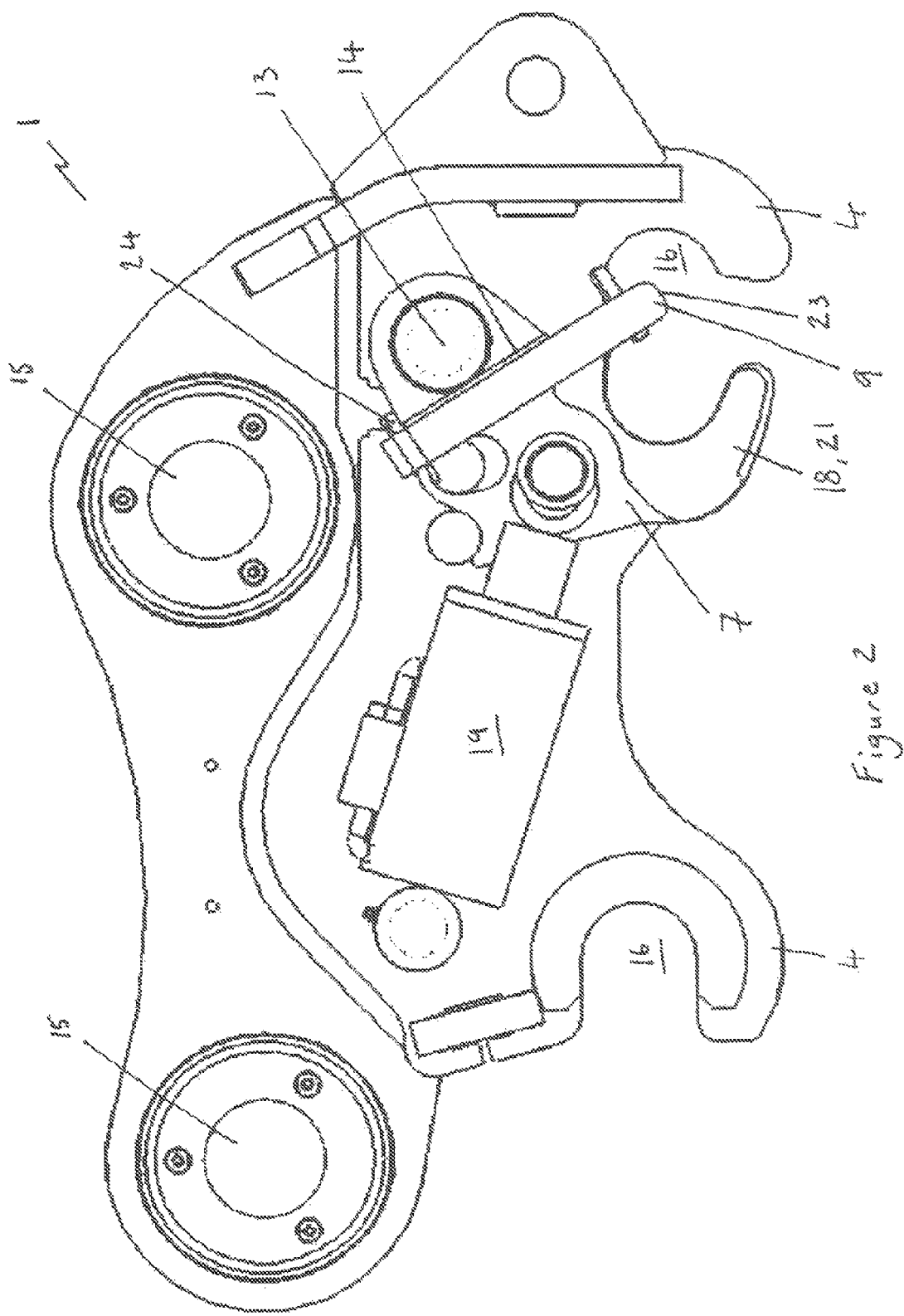
FIG. 2 is a schematic drawing of the quick hitch coupler with the gravity operated locking arrangement in a tool pin locking position with the latching arrangement in a tool locking position.
Figure 3:
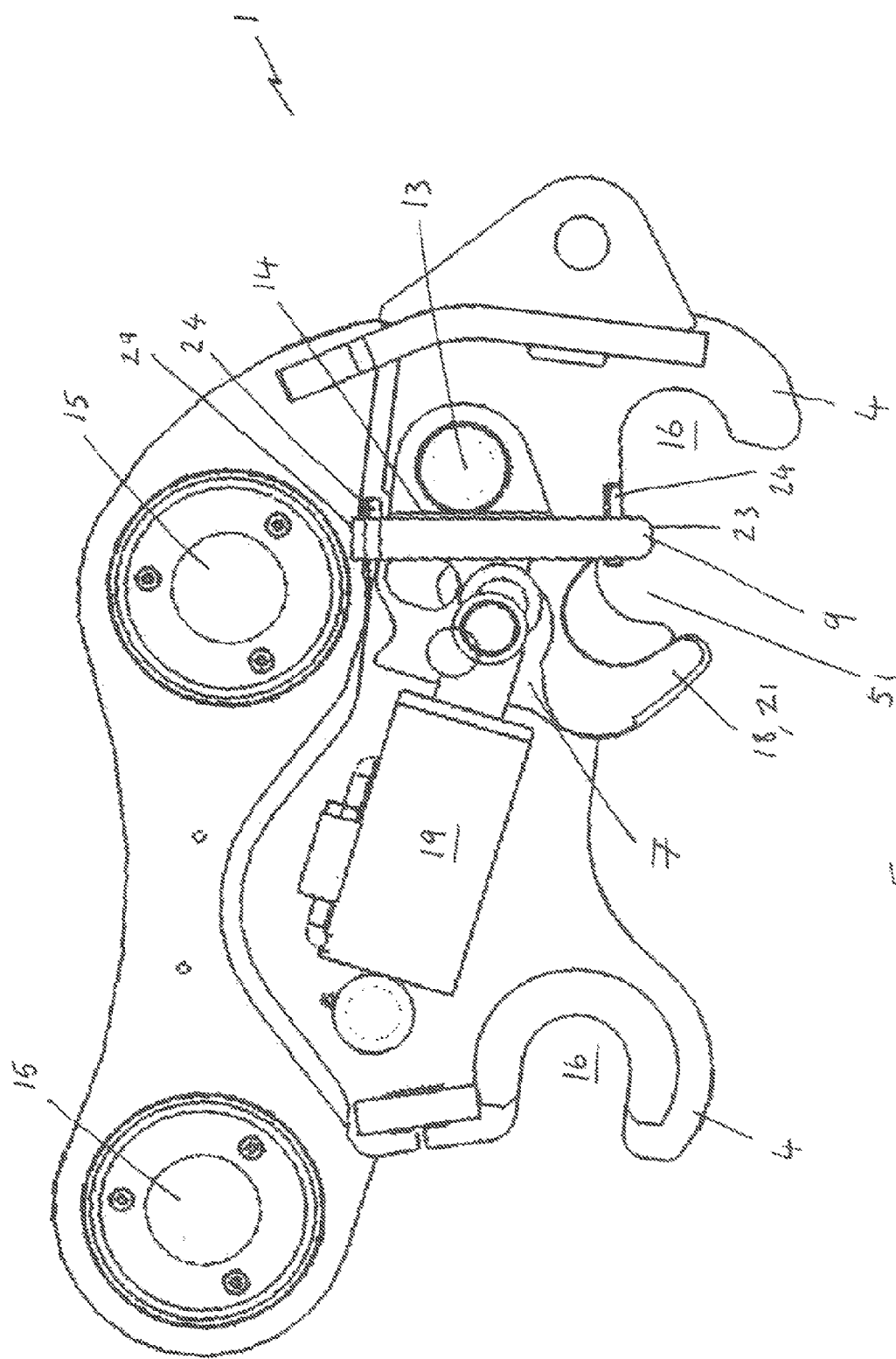
FIG. 3 is a schematic drawing of the quick hitch coupler with the gravity operated locking arrangement in a tool pin locking position with the latching arrangement in a tool releasing position.
Figure 4:
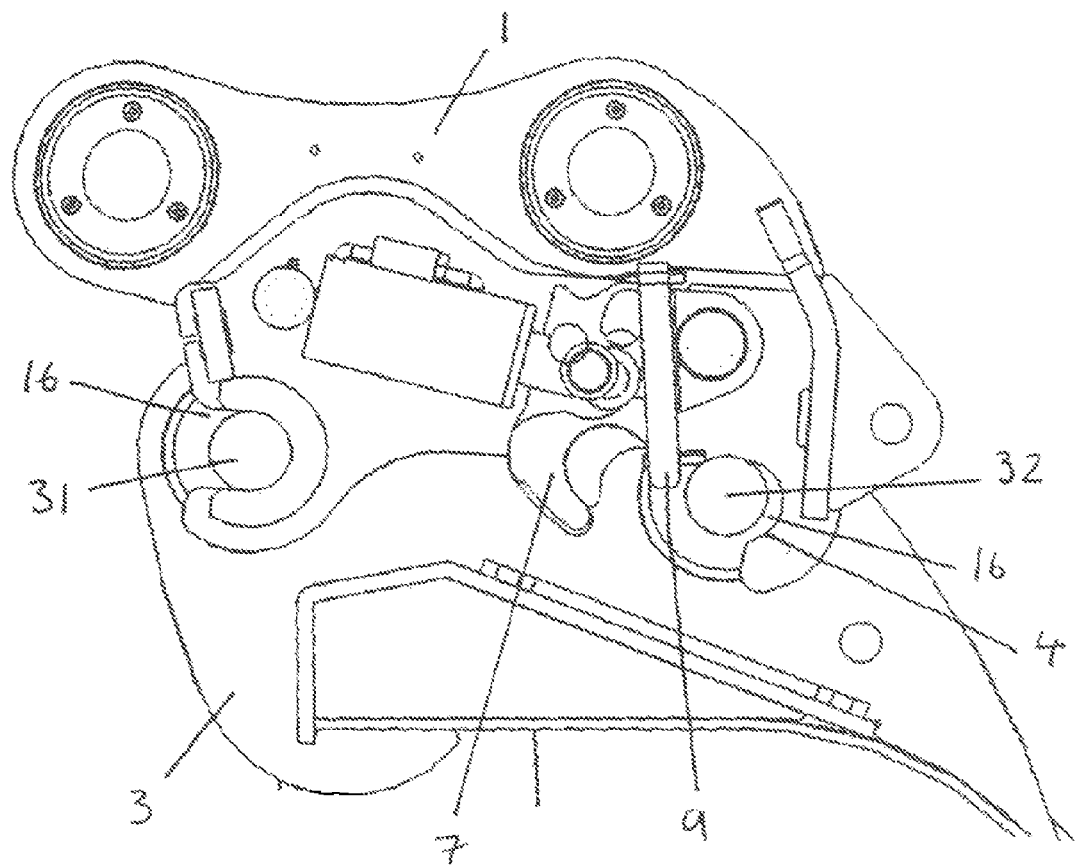
FIG. 4 is a schematic drawing of the quick hitch coupler with the gravity operated locking arrangement in a tool pin locking position with the latching arrangement in a tool releasing position.

Referring initially to FIGS. 1 to 3, there is shown a quick hitch coupler indicated generally by the reference numeral 1 having an arrangement for releasably coupling a tool such as an excavator tool to the quick hitch coupler 1. The arrangement for releasably coupling the tool to the quick hitch coupler 1 has tool pin engaging members 4 on spaced apart portions of the main body 213 of the quick hitch coupler 1. One of the tool pin engaging members 4 has an associated latching member 7 movably mounted on the main body 213 of the quick hitch coupler 1 between a tool pin locking position see FIGS. 1 and 2 and a tool pin releasing position see FIG. 3. The latching member 7 has a gravity operated lock 9 movably mounted on the latching member 7 for locking the tool 3 onto the quick hitch coupler 1 in normal use. It will of course be appreciated that the lock 9 is described as gravity operated in this embodiment for illustration purposes only and that it will be appreciated that any other means of moving the lock 9 is encompassed by the present invention.

The latching member 7 has an arrangement in the form of a through bore or slot 14 for guiding movement of the gravity operated lock 9. The quick hitch coupler 1 has a pair of mounting pins 15 for releasably mounting the quick hitch coupler 1 to the mechanical hoe arm or mechanical hoe arm of a vehicle such as an excavator. The tool pin engaging members 4 define tool pin receiving apertures 16 and the tool pin receiving apertures 16 are facing in the same direction, generally opening towards the vehicle they are attached to. The latching member 7 comprises a barrier element 18 movably mounted and in the drawings pivotally mounted about pivot pin 13 on the main body 213 of the quick hitch coupler 1 for locking a tool pin in one of the tool pin receiving apertures 16. The latching member 7 also has a motive element 19 coupled between the main body 213 of the quick hitch coupler 1 and the barrier element 18 for moving the barrier element 18 between a tool pin locking position, see FIGS. 1 and 2 and a tool pin releasing position, see FIG. 3.

The barrier element 18 is provided by a latching hook 21 moveable between a tool pin locking position, see FIGS. 1 and 2 and a tool pin releasing position, see FIG. 3. The motive element 19 is a hydraulic cylinder. Advantageously, the hydraulic cylinder 19 is operable by the machine operator from the cab of the excavator. The latching hook 21 has a through bore or slot 14 for guiding movement of the gravity operated lock 9. The gravity operated lock 9 normally rests in a tool pin locking position as shown in FIGS. 2 and 3.

Figure 12:
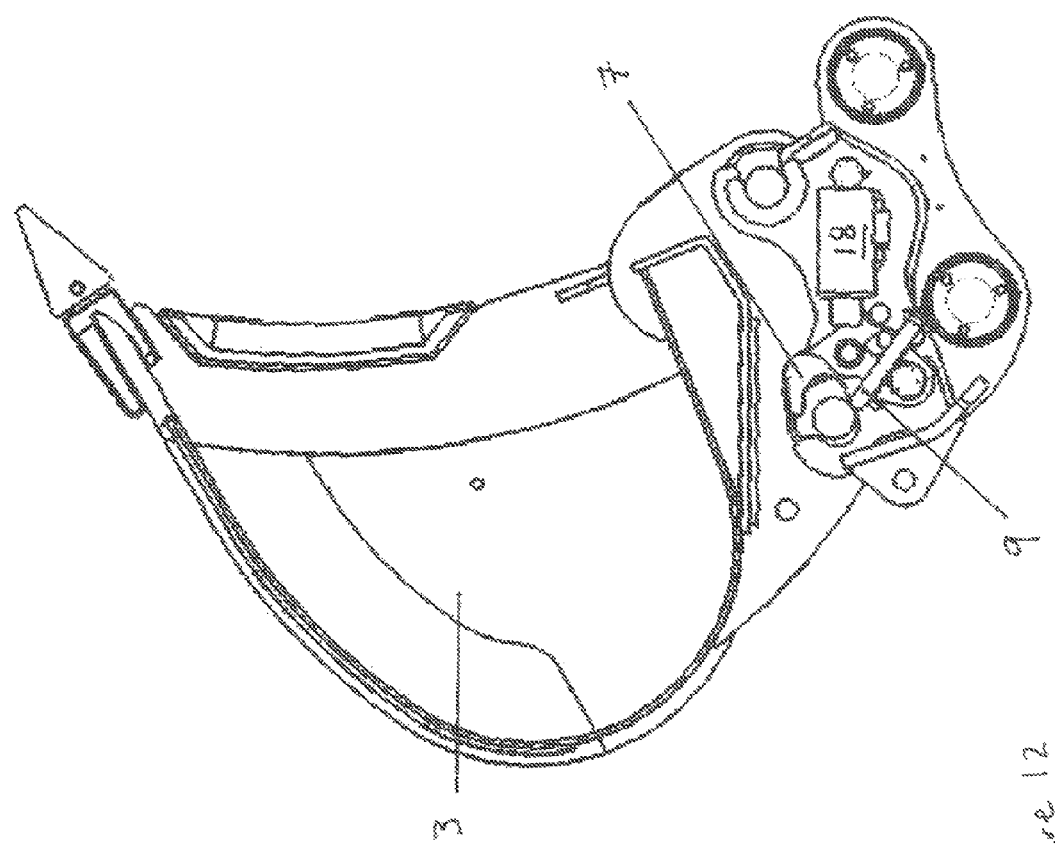
FIG. 12 is a schematic drawing of the quick hitch coupler with a tool attached and the gravity operated locking arrangement in a tool pin releasing position with the latching arrangement in between a tool locking position and a tool releasing position at the fully crowded position of the tool decoupling procedure.
Figure 13:
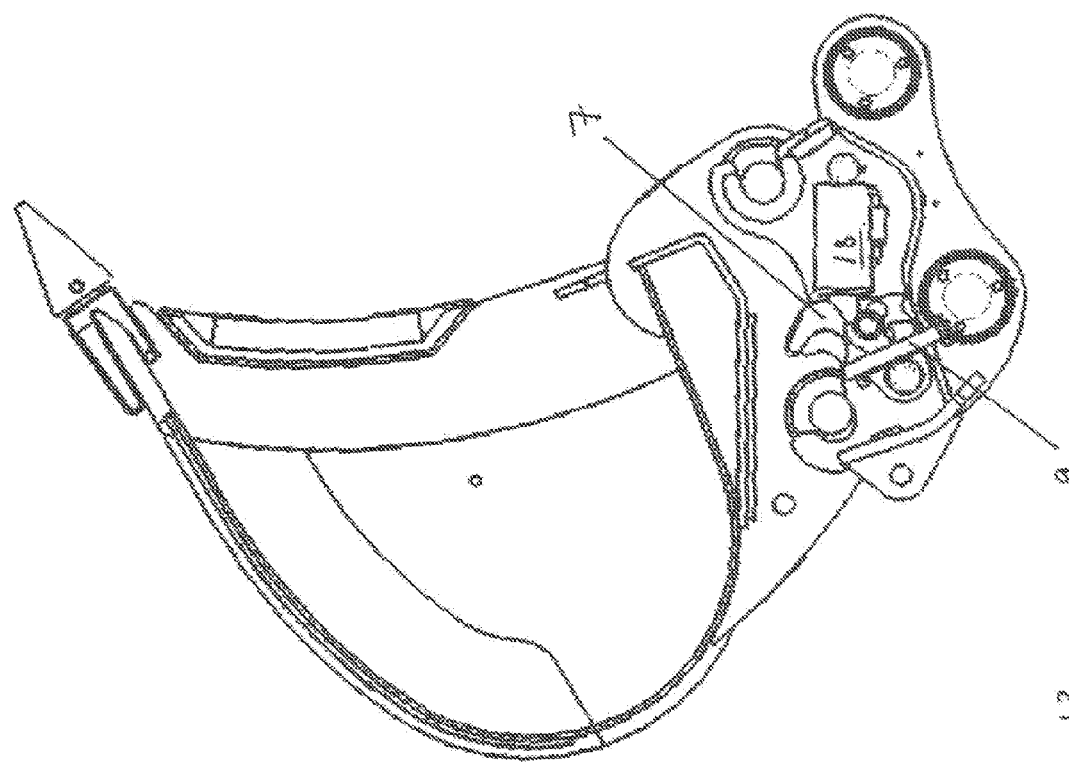
FIG. 13 is a schematic drawing of the quick hitch coupler with a tool attached and the gravity operated locking arrangement in a tool pin releasing position with the latching arrangement in a tool releasing position at the fully crowded position of the tool decoupling procedure.

The gravity operated lock 9 rests in a tool pin releasing position see FIG. 1 when the quick hitch coupler 1 is in the fully crowded position, see FIGS. 12 and 13. This fully crowded position is widely accepted in the industry as a safe position for decoupling a tool from a quick hitch coupler 1 of an excavator. The position occurs when the mechanical hoe arm brings the tool in as close to the body of the excavator as the mechanical linkages will allow and the hydraulic rams of the mechanical hoe arm coupled to the quick hitch coupler 1 are in the fully extended position leaving the tool in a substantially inverted position, again see FIGS. 12 and 13.

One end 23 of the gravity operated lock 9 is extendable out of the through bore or slot 14 of the latching member 7 defining a gap between the gravity operated lock 9 and the latching member 7. The gap is formed for securing a tool pin between the gravity operated lock 9 and the latching member 7. The end 23 of the gravity operated lock 9 is extendable in front of the barrier element 18 to interact with the barrier element 18 to secure a tool pin there between. Both ends 23, 29 of the gravity operated lock 9 have catch members 24 for preventing the gravity operated lock 9 falling out of the through bore or slot 14 of the latching member 7. The catch members 24 are provided by dowel pins 24 on both ends 23, 29 of the gravity operated lock 9 preventing the gravity operated lock 9 from falling out of the through bore or slot 14 although any form of catch members 24 are encompassed. The gravity operated lock 9 is manufactured from a block plate. Advantageously, the block plate is slidably mounted in a through bore or slot 14 of corresponding shape formed in the latching member 7.

It will of course be appreciated that the weight and strength of the gravity operated lock 9 is dependent upon the size and function of the quick hitch coupler 1 and can be varied to suit the specific requirements of any quick hitch coupler 1.

Figure 17:
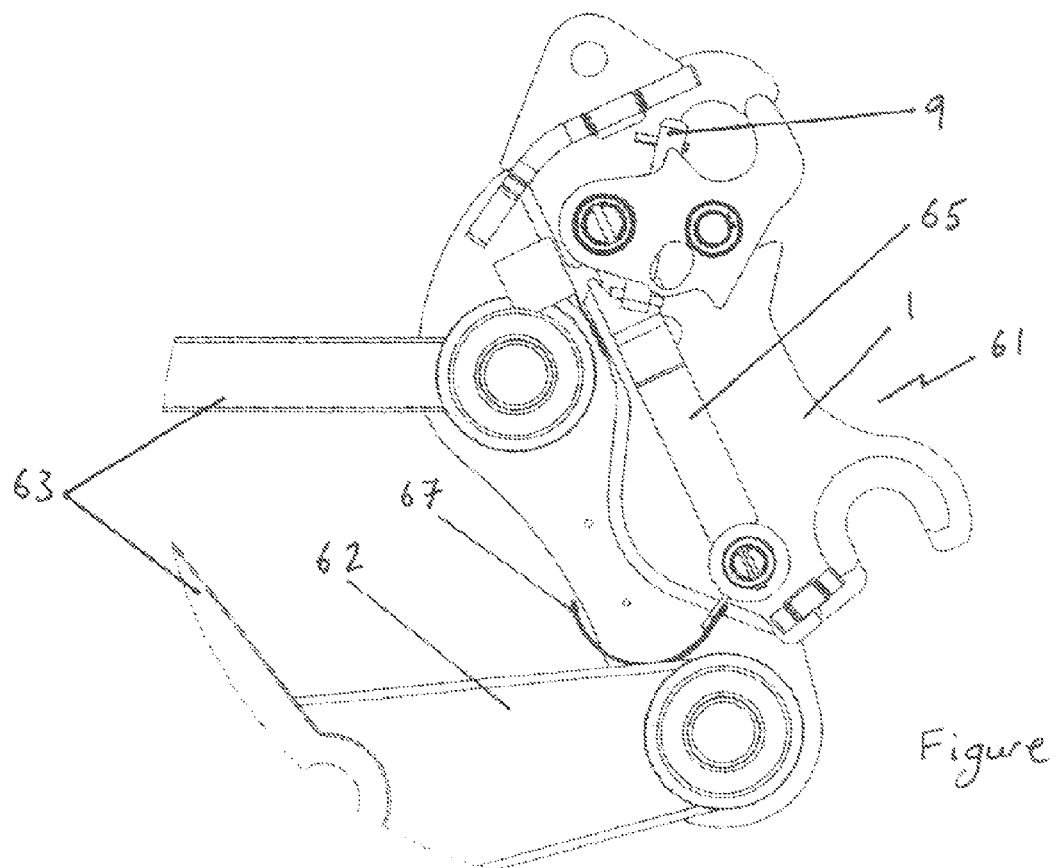
FIG. 17 is a partial schematic drawing showing an engagement member provided on the quick hitch coupler for preventing the gravity operated lock from moving to the tool pin releasing position when the mechanical hoe arm is fully extended.

Referring now to FIG. 17, an engagement member indicated generally by the reference numeral 61 is provided on the quick hitch coupler 1 for preventing the gravity operated lock 9 from moving to the tool pin releasing position when the mechanical hoe arm 62 is fully extended. The fully extended position of the mechanical hoe arm 62 shown in this drawing is the position the mechanical hoe arm 62 will hold a tool 3 in when the mechanical hoe arm 62 and hydraulic rams 63 acting between the mechanical hoe arm 62 and the quick hitch coupler 1 are at one limit of their range of movements. The mechanical hoe arm 62 and hydraulic rams 63 acting between the mechanical hoe arm 62 and the quick hitch coupler 1 are at the second limit of their range of movements when the tool 3 is at the fully crowded position, see FIGS. 12 and 13.

The engagement member 61 is provided by a blocking member 65 movably mounted on the main body 213 of the quick hitch coupler 1 so as to retain the gravity operated lock 9 in the tool pin locking position as shown when the mechanical hoe arm 62 is in the fully extended position. The blocking member 65 has one end formed for engaging the gravity operated lock 9 and a second end pivotally mounted onto the main body 213 of the quick hitch coupler 1. The engagement member 61 has a biasing element 67 in the form of a leaf spring operably engaged with the blocking member 65 to hold the blocking member 65 in a position to retain the gravity operated lock 9 in the tool pin locking position when the mechanical hoe arm 62 is in the fully extended position as shown. The biasing element 67 temporarily engages the mechanical hoe arm 62 to retain the blocking member 65 in a position to retain the gravity operated lock 9 in the tool pin locking position. When the mechanical hoe arm 62 is maneuvered away from the fully extended position towards the fully crowded position, the biasing element disengages the mechanical hoe arm 62 and the end of the blocking member 65 engaging the gravity operated lock 9 falls away from the lock 9 under gravity allowing the gravity operated lock 9 to move into a tool pin releasing position.

Now with reference to FIGS. 4 to 7, a method of coupling the quick hitch coupler 1 to a tool 3 provided by an excavator tool 3 is described. The quick hitch coupler is identical to the quick hitch coupler 1 as described with reference to FIGS. 1 to 3 so a detailed description of the components is not necessary.

In order to couple the tool 3, only partially shown, to the quick hitch coupler 1 a machine operator moves the back arm of the excavator and coupler 1 so that the leading edge tool pin receiving apertures 16 are brought into contact with the leading edge tool pin 31 of the tool 3. The tool 3 is raised off the ground by the operator and the quick hitch coupler 1 is maneuvered until the trailing edge tool pin 32 is located into the receiving apertures 16 of the trailing edge tool pin engaging members 4. In this position, the gravity operated lock 9 is in a tool pin locking position with the latching member 7 in a tool releasing position.

Figure 5:
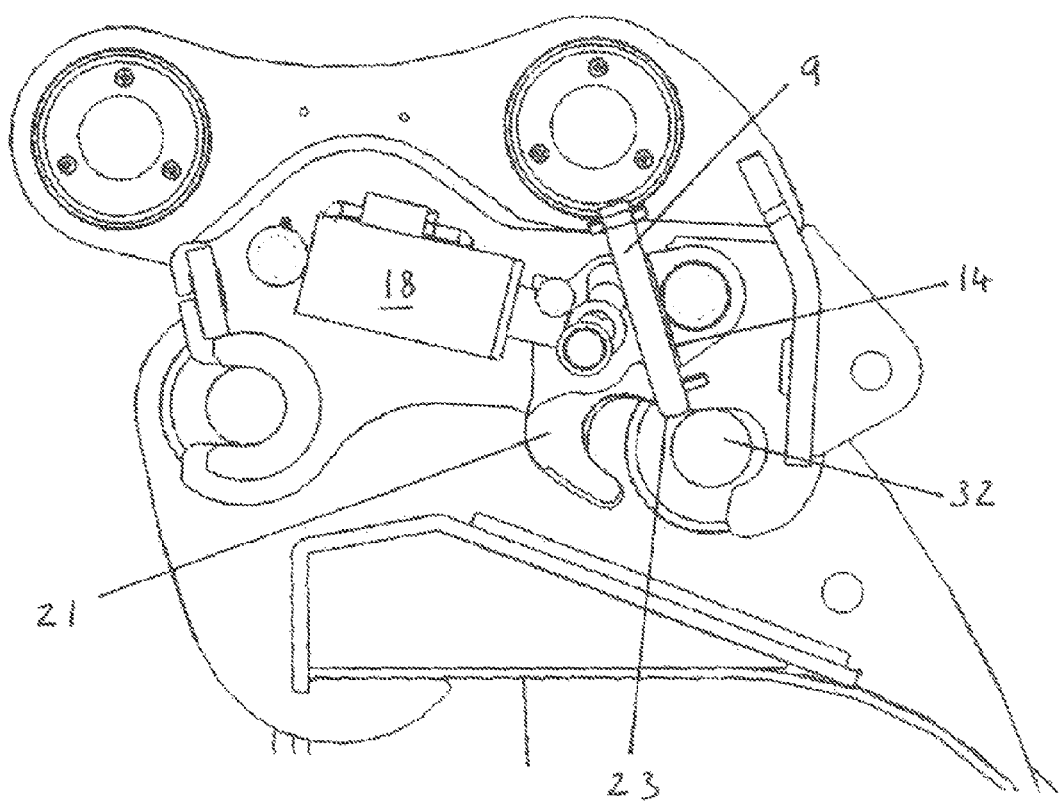
FIG. 5 is a schematic drawing of the quick hitch coupler with the gravity operated locking arrangement in a partial tool pin releasing position with the latching arrangement in between a tool releasing position and a tool engaging position.

In FIG. 5, the operator has activated the hydraulic cylinder 18 and the extendable end 23 of the gravity operated lock 9 is moved upwards in the through bore or slot 14 of the latching hook 21 by contact with the tool pin 32 as the latching hook 21 moves towards the tool pin 32 to accommodate locking of the tool pin 32 onto the quick hitch coupler 1.

Figure 6:
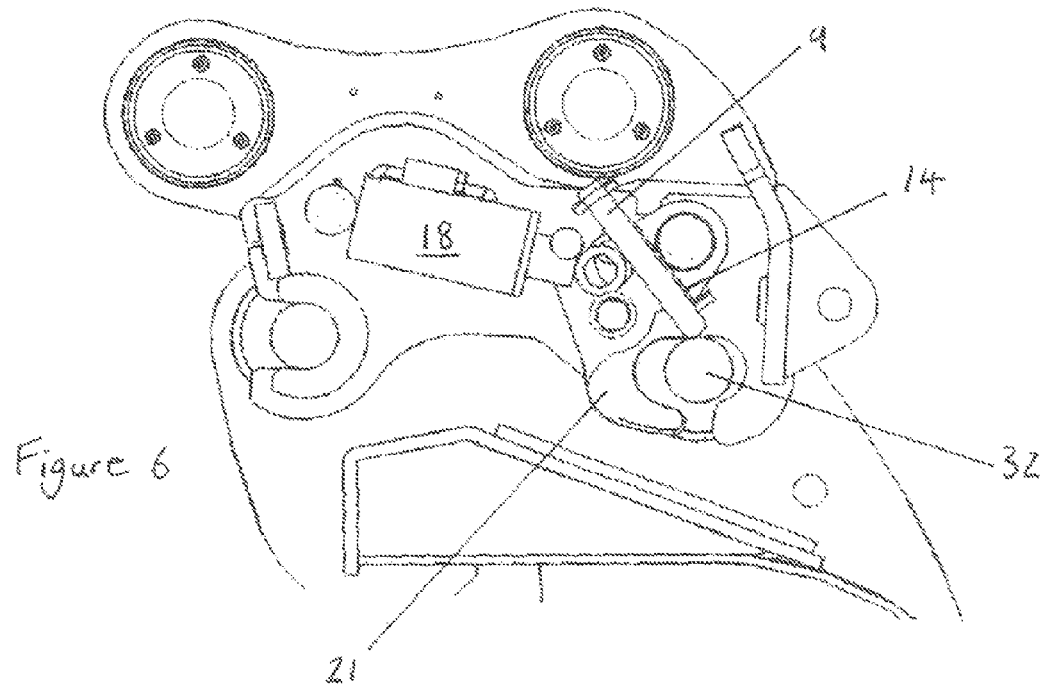
FIG. 6 is a schematic drawing of the quick hitch coupler with the gravity operated locking arrangement in a tool pin releasing position with the latching arrangement nearing a tool locking position.
Figure 7:
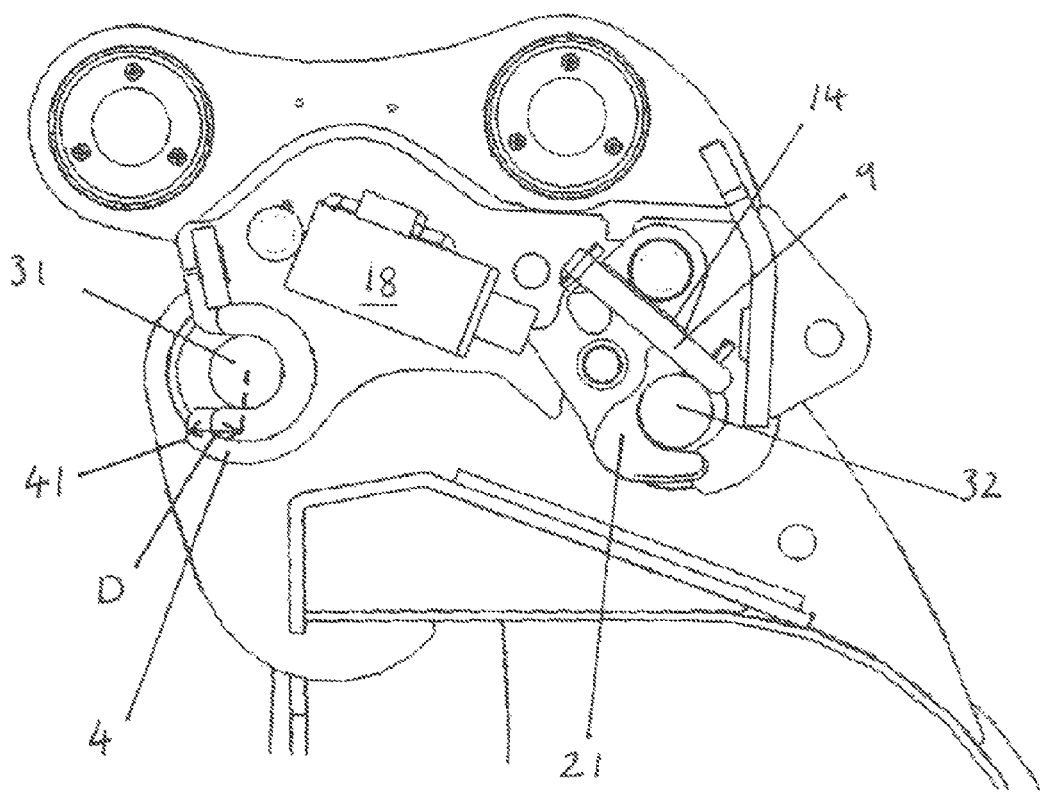
FIG. 7 is a schematic drawing of the quick hitch coupler with the gravity operated locking arrangement in a tool pin locking position with the latching arrangement in a tool locking position.

In FIG. 6, the gravity operated lock 9 is further pushed up into the through bore or slot 14 of the latching hook 21 by the applied contact force with the tool pin 32 as the hydraulic cylinder 18 continues to push the latching hook 21 towards the tool locking position. Advantageously, this allows the gravity operated lock 9 to be moved from the pin locking position of FIG. 4 to the pin releasing position shown in this drawing. As the hydraulic cylinder 18 reaches the end of its travel as shown in FIG. 7, the gravity operated lock 9 falls down into the through bore or slot 14 of the latching hook 21 by the force of gravity as the gravity operated lock 9 passes over the top of the tool pin 32. In this position, the tool pin 32 is locked to the quick hitch coupler 1 by the interaction between the gravity operated lock 9 and the latching hook 21. In the event of an accidental activation of the hydraulic cylinder 18, the tool pin 32 will remain clamped between the lock 9 and the latching hook 21 and the centre of the tool pin 31 will not pass beyond the leading edge 41 of the tool pin engaging member 4. The travel of the hydraulic cylinder 18 is less than the distance between the centre of the leading edge pin 31 and the leading edge of the tool pin engaging member 4 marked D in FIG. 7.

Figure 8:
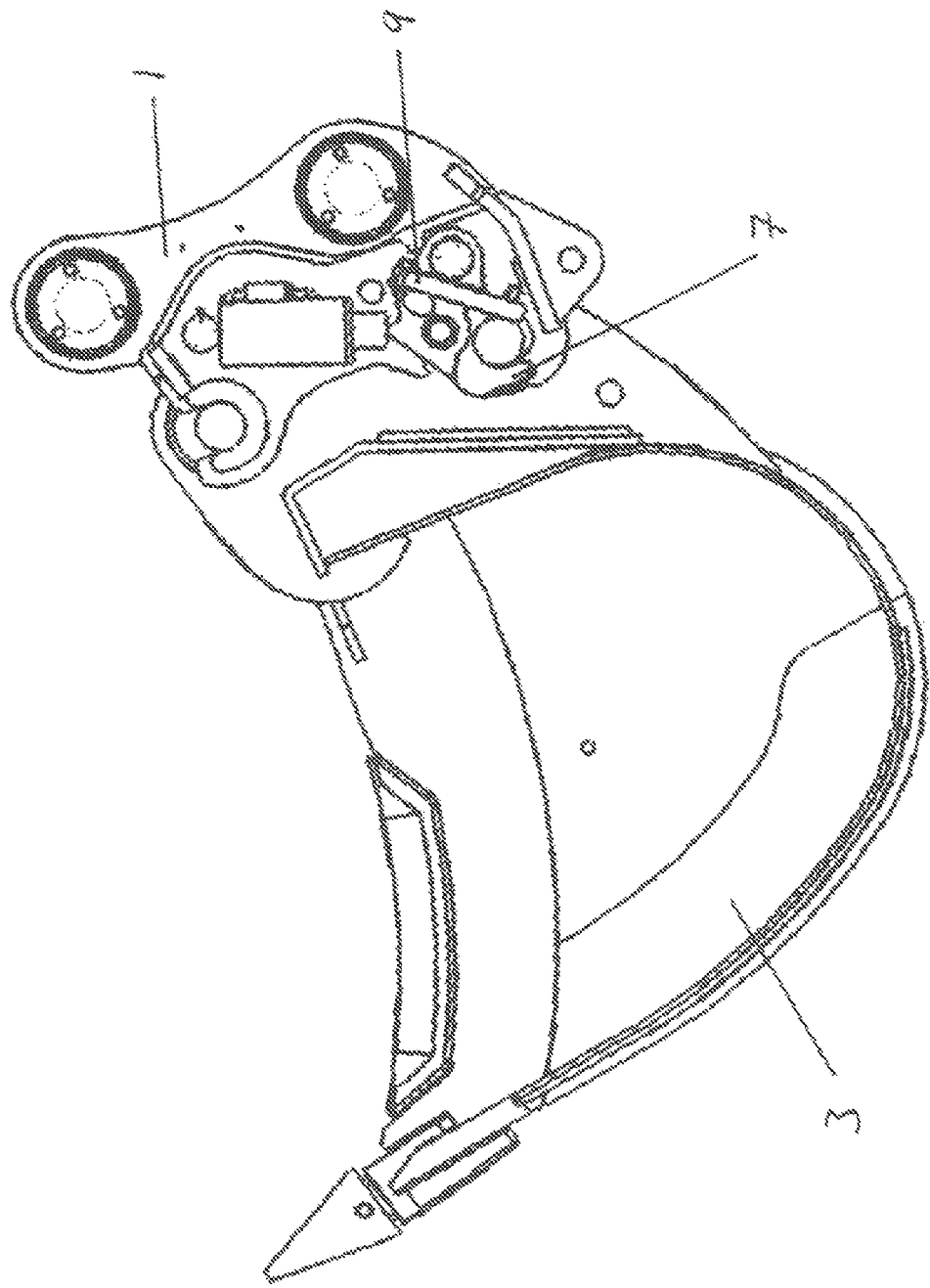
FIG. 8 is a schematic drawing of the quick hitch coupler with a tool attached and the gravity operated locking arrangement in a tool pin locking position with the latching arrangement in a tool locking position at the start of the tool decoupling procedure.
Figure 9:
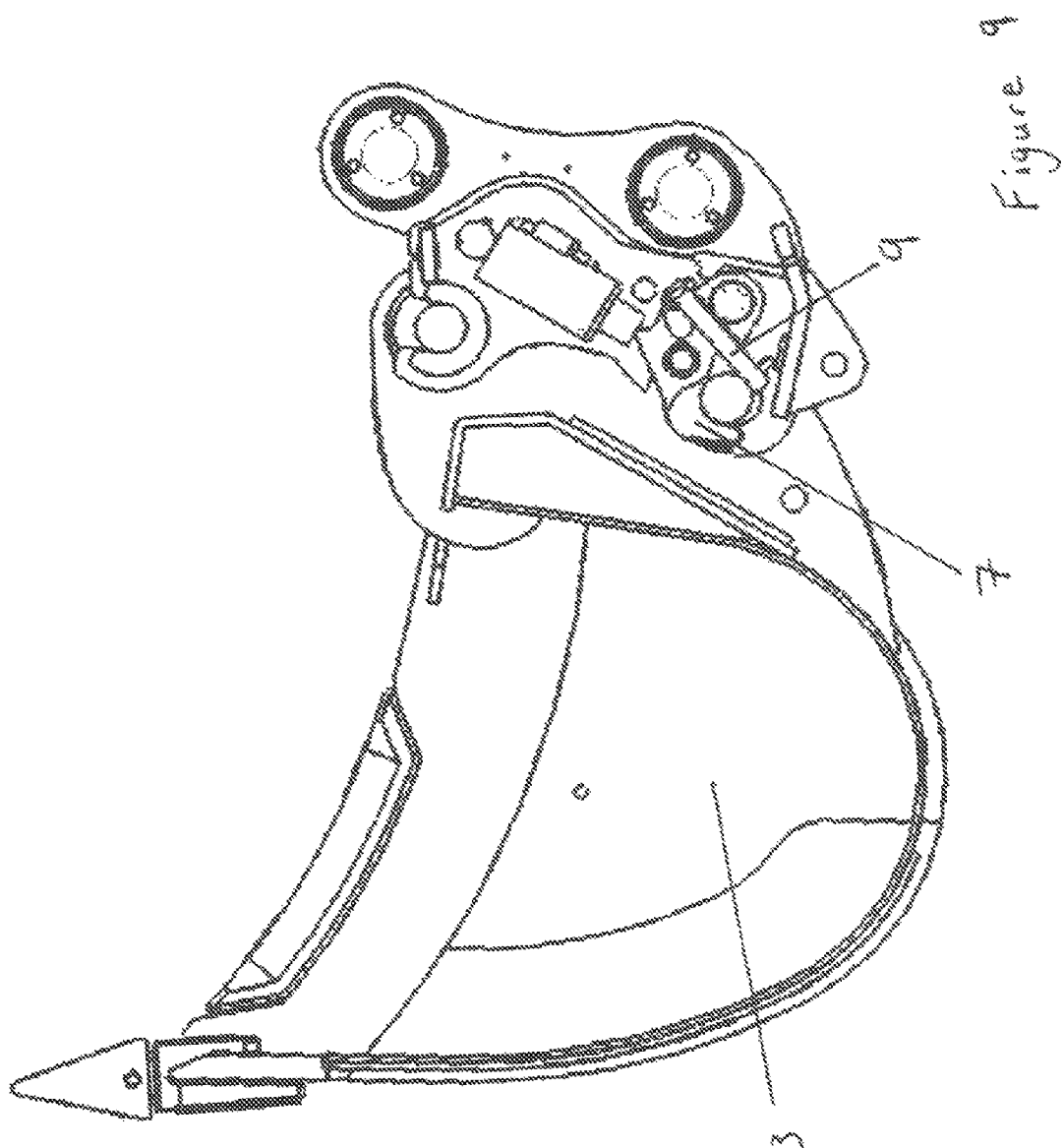
FIG. 9 is a schematic drawing of the quick hitch coupler with a tool attached and the gravity operated locking arrangement in a tool pin locking position with the latching arrangement in a tool locking position at stage 2 of the tool decoupling procedure.
Figure 10:
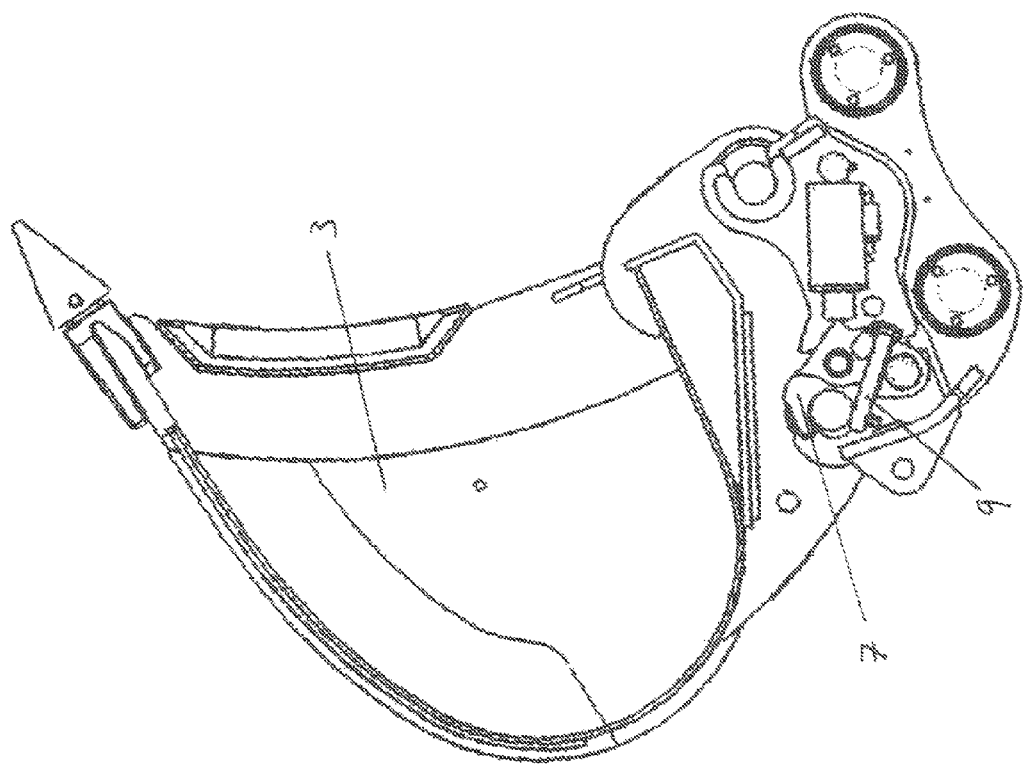
FIG. 10 is a schematic drawing of the quick hitch coupler with a tool attached and the gravity operated locking arrangement in a tool pin locking position with the latching arrangement in a tool locking position at stage 3 of the tool decoupling procedure.
Figure 11:
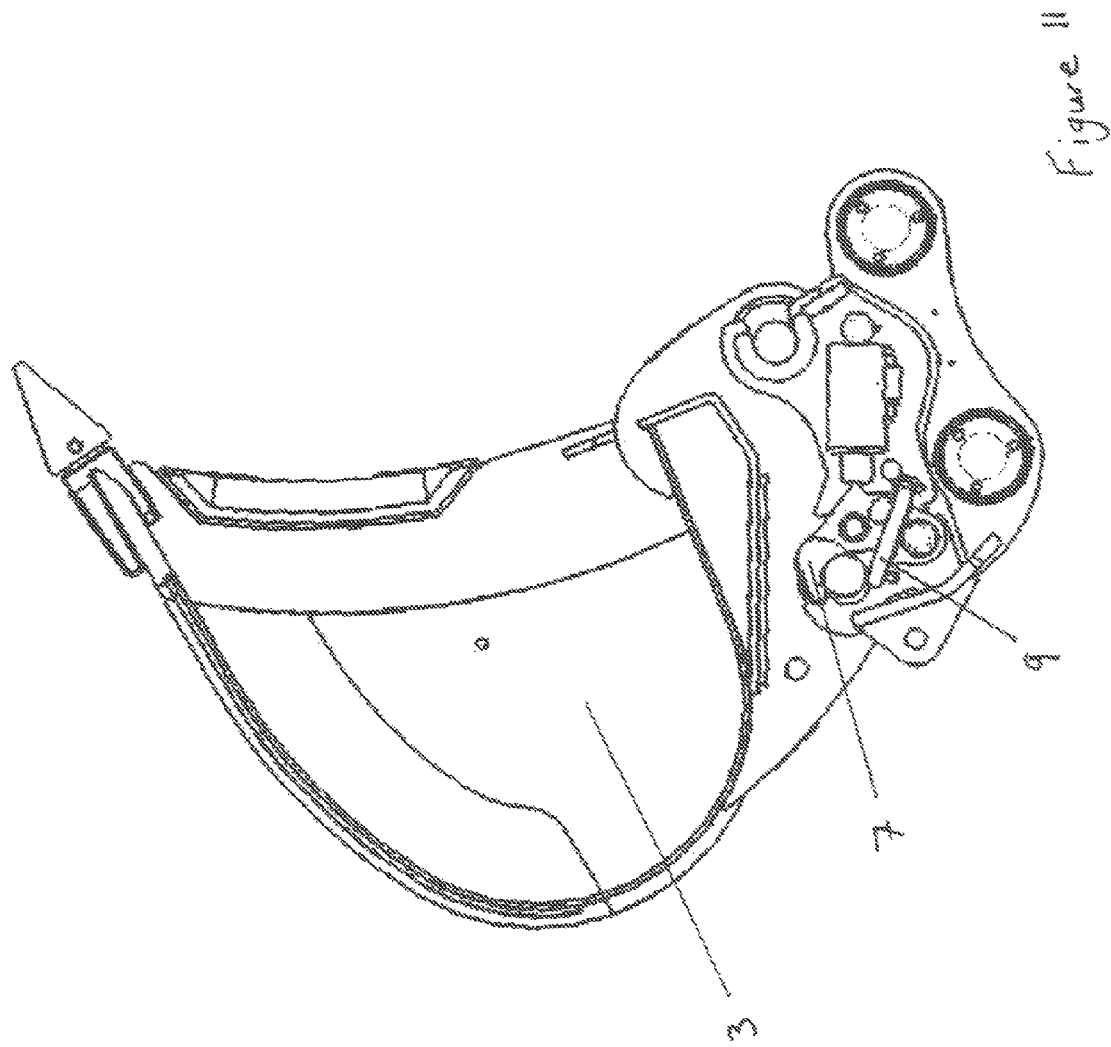
FIG. 11 is a schematic drawing of the quick hitch coupler with a tool attached and the gravity operated locking arrangement in a tool pin releasing position with the latching arrangement in a tool locking position at the fully crowded position of the tool decoupling procedure.

In order to decouple the tool 3 from the quick hitch coupler 1, the required steps are described with reference to FIGS. 8 to 16. In FIG. 8, the gravity operated lock 9 is in a tool pin locking position with the latching member 7 in a tool locking position at the start of the tool decoupling procedure. In FIG. 9, the machine operator has commenced to rotate the tool 3 in a clockwise direction with the gravity operated lock 9 still in a tool pin locking position and the latching member 7 in a tool locking position at stage 2 of the tool decoupling procedure. In FIG. 10, the machine operator continues to rotate the tool 3 towards the fully crowded position with the gravity operated lock 9 in a tool pin locking position and the latching member 7 is in a tool locking position at stage 3 of the tool decoupling procedure. FIG. 11 shows the tool 3 rotated to the fully crowded position of the tool decoupling procedure with the gravity operated lock 9 having fallen into a tool pin releasing position with the latching member 7 still in a tool locking position. In FIG. 12, the machine operator has activated the hydraulic cylinder 18 at the fully crowded position of the tool decoupling procedure and the latching member 7 is in between a tool locking position and a tool releasing position. The gravity operated lock 9 is in a tool pin releasing position. In FIG. 13, the hydraulic cylinder 18 has reached the end of its travel and the gravity operated lock 9 is in a tool pin releasing position. The latching member 7 is in a tool releasing position at the fully crowded position of the tool decoupling procedure.

Figure 14:
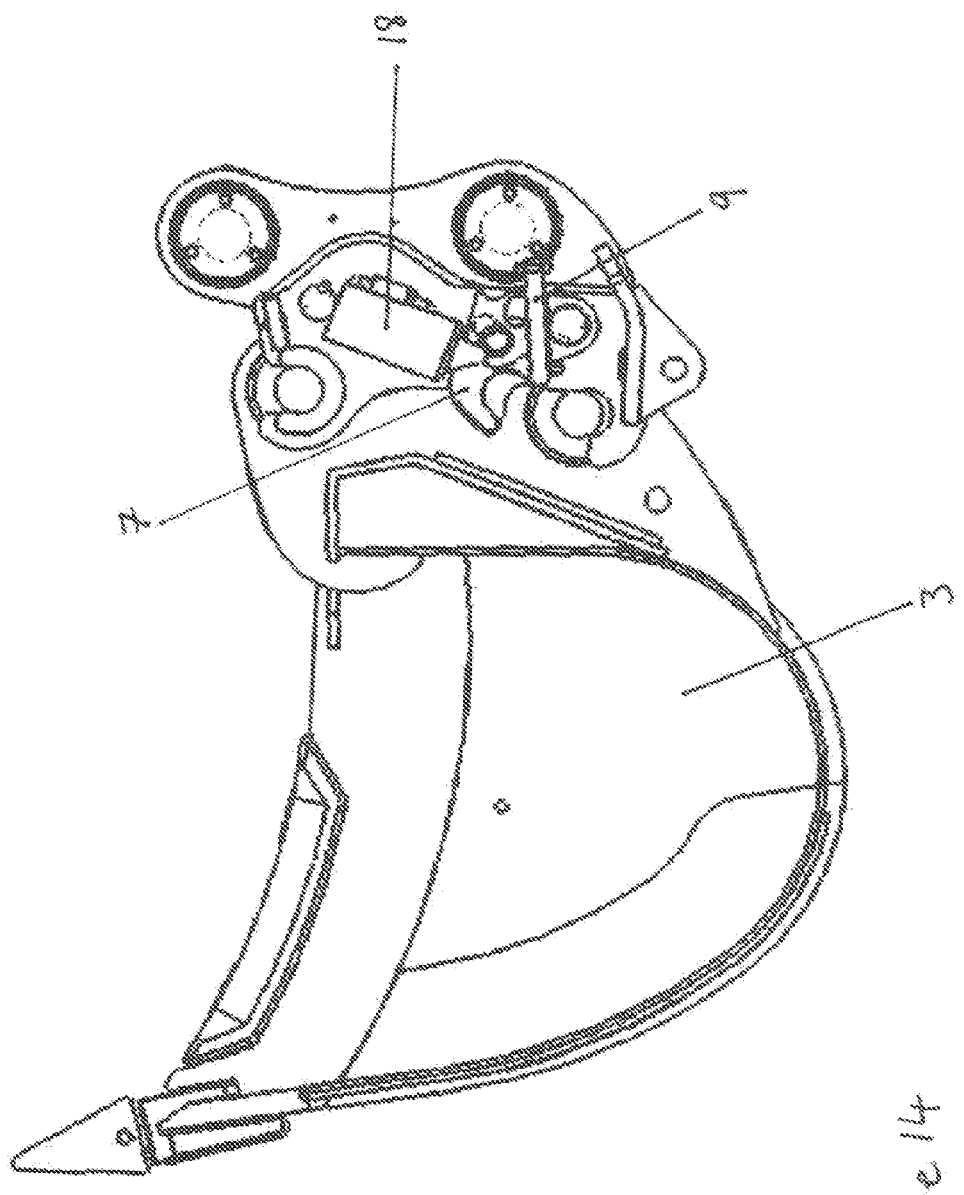
FIG. 14 is a schematic drawing of the quick hitch coupler with a tool attached and the gravity operated locking arrangement in a tool pin releasing position with the latching arrangement in a tool releasing position as the tool is rotated away from the fully crowded position.
Figure 16:
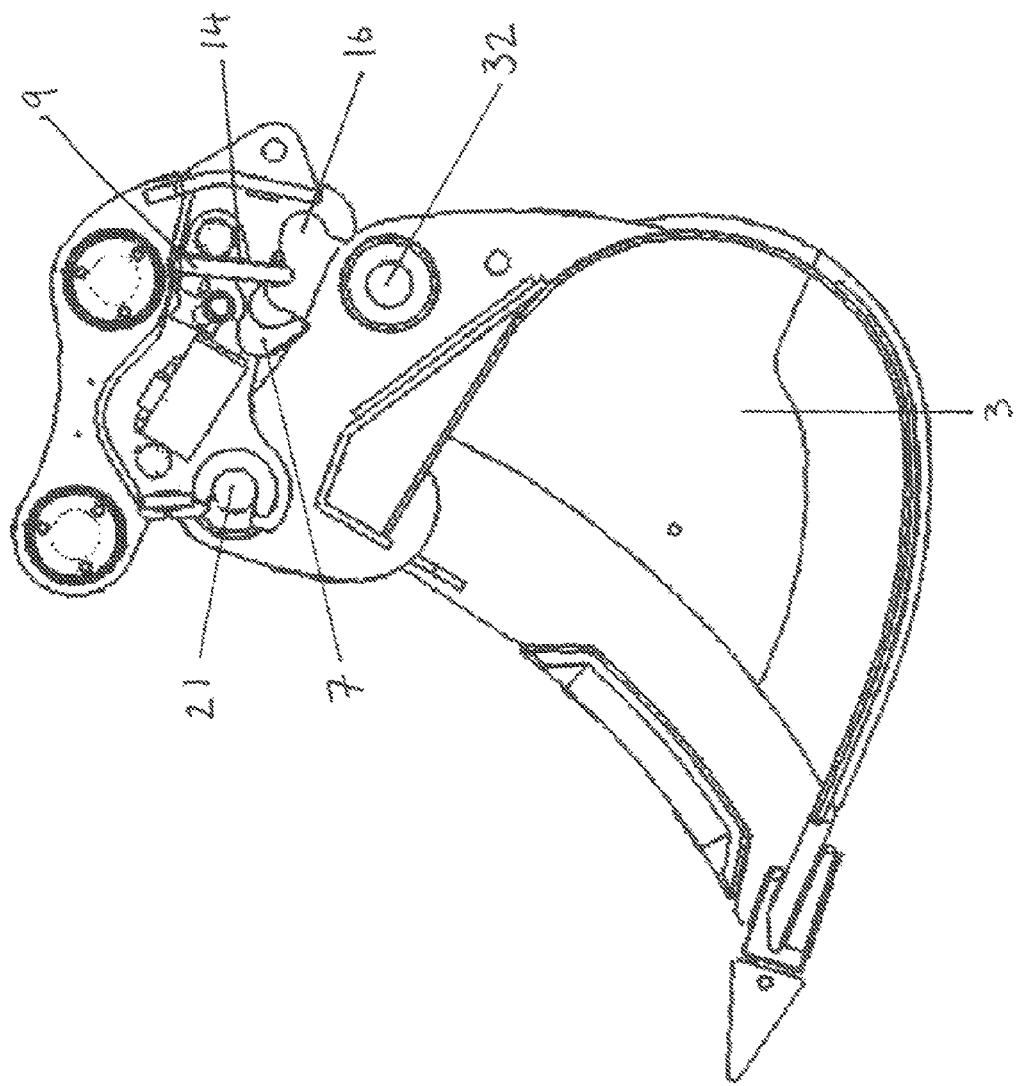
FIG. 16 is a schematic drawing of the quick hitch coupler with a tool detached and the gravity operated locking arrangement in a tool pin locking position with the latching arrangement in a tool releasing position with the tool fully decoupled.

In FIG. 14, the machine operator has commenced to rotate the tool 3 anticlockwise away from the fully crowded position of FIGS. 11 to 13. The hydraulic cylinder 18 remains at the end of its travel, the gravity operated lock 9 stays in a tool pin releasing position and the latching member 7 is in a tool releasing position. As the machine operator continues to rotate the tool 3 in an anticlockwise direction as shown in FIG. 15, the gravity operated lock 9 falls back through the through bore or slot 14 into in a tool pin locking position under the force of gravity. However, by this time the tool pin 32 has fallen out of the tool pin receiving apertures 16 as the tool 3 swings about the tool pin 21 under the force of gravity. The latching member 7 is still in a tool releasing position with the tool 3 partially decoupled. In FIG. 16, the machine operator maneuvers the quick hitch coupler 1 so that the tool pin 21 slides out of the tool pin receiving apertures 16 at the leading edge of the coupler 1 with the tool 3 totally detached. The gravity operated lock 9 is in a tool pin locking position with the latching member 7 in a tool releasing position ready to couple another tool 3 onto the quick hitch coupler 1.

Referring finally to FIGS. 18 to 21, there is shown a second embodiment of quick hitch coupler indicated generally by the reference numeral 101 having an arrangement for releasably coupling a tool such as an excavator tool to the quick hitch coupler 101. The arrangement for releasably coupling the tool to the quick hitch coupler 101 has tool pin engaging members 104 on spaced apart portions of the main body 213 of the quick hitch coupler 101. One of the tool pin engaging members 104 has an associated latching member 107 movably mounted on the main body 213 of the quick hitch coupler 101 between a tool pin locking position see FIG. 18 and a tool pin releasing position see FIG. 20. The latching member 107 has a lock 109 see FIGS. 20 and 21 movably mounted on the latching member 107 for locking a tool onto the quick hitch coupler 101 in normal use.

The latching member 107 has an arrangement in the form of a through bore or slot 114 for guiding movement of the lock 109. The quick hitch coupler 101 has a pair of mounting pins 115 for releasably mounting the quick hitch coupler 101 to the mechanical hoe arm or mechanical hoe arm of a vehicle such as an excavator. The tool pin engaging members 104 define tool pin receiving apertures 116 and the tool pin receiving apertures 116 are facing in the same direction, generally opening towards the vehicle they are attached to.

In this second embodiment, the latching member 107 is movable linearly along the main body 213 of the quick hitch coupler 101 between a tool pin locking position and a tool pin releasing position. The latching member 107 is slidably mounted on a track member 121 coupled to the main body 213 to guide the linear movement of the latching member 107 and the track member 121 is provided by a block of material having a quadrangular cross section. The latching member 107 is provided by a latching hook 131 having a latching hook main body 132 with an arrangement for interacting with the track member 121. The arrangement for interacting with the track member 121 is provided by a through bore or slot extending through the latching hook main body 132 of the latching member 107. A motive element preferably in the form of a hydraulic cylinder (not shown) is coupled between the linearly 15 movable latching member 107 and the quick hitch coupler 101 to effect the movement of the latching member 107. The lock 109 on this linearly adjustable latching member 107 operates in the same way as the lock 9 of the pivotally movable latching member 9 of the first embodiment described above.

The features disclosed in the foregoing description or the following drawings, expressed in their specific forms or in terms of a means for performing a disclosed function, or a method or a process of attaining the disclosed result, as appropriate, may separately, or in any combination of such features be utilized for realizing the invention in diverse forms thereof as defined in the appended claims.

What is claimed is:

1. A quick hitch coupler comprising:
   a means for releasably coupling a tool to the quick hitch coupler, the means for releasably coupling a tool to the quick hitch coupler including;
   at least two tool pin engaging means on spaced apart portions of a main body of the quick hitch coupler,
   one tool pin engaging means having an associated latching member movably mounted on the main body of the quick hitch coupler, that moves between a tool pin locking position and a tool pin releasing position,
   the latching member having a lock carried on and moving in tandem with the latching member for securing a tool pin onto the latching member;
   wherein when the tool is in a fully crowded position, the lock automatically disengages the tool pin prior to the latching member moving into a tool pin releasing position; and
   wherein one end of the lock protrudes out of the latching member defining a gap between the lock and the latching member, the gap being formed for receiving a tool pin between the lock and the latching member.

2. The quick hitch coupler of claim 1, wherein the latching member is pivotally mounted on the main body of the quick hitch coupler.

3. The quick hitch coupler of claim 1, wherein the latching member is movable linearly along the main body of the quick hitch coupler between a tool pin locking position and a tool pin releasing position.

4. The quick hitch coupler of claim 1, wherein the latching member and the lock interact for securing a tool pin onto the latching member.

5. The quick hitch coupler of claim 1, wherein the latching member has means for guiding movement of the lock.

6. The quick hitch coupler of claim 1, wherein the latching member has a through bore or slot for guiding movement of the lock.

7. The quick hitch coupler of claim 1, wherein the latching member comprises a barrier means movably mounted on the main body of the quick hitch coupler for locking the tool pin in tool pin receiving apertures and motive means coupled between the main body of the quick hitch coupler and the motive means for moving the barrier means between a tool pin locking position and a tool pin releasing position.

8. The quick hitch coupler of claim 7, wherein the barrier means is provided by a latching hook moveable between a tool pin locking position and a tool pin releasing position.

9. The quick hitch coupler of claim 8, wherein the latching hook has a through bore or slot for guiding movement of the lock.

10. The quick hitch coupler of claim 1, wherein the lock normally rests in a tool pin locking position.

11. The quick hitch coupler of claim 1, wherein the lock rests in a tool pin releasing position when the quick hitch coupler is in a fully crowded position.

12. The quick hitch coupler of claim 6, wherein one end of the lock is extendable out of the through bore or slot of the latching member in front of a barrier means.

13. The quick hitch coupler of claim 1, wherein one or both ends of the lock has catch means for preventing the lock falling out of the latching member.

14. The quick hitch coupler of claim 1, wherein engagement means are provided on the main body of the quick hitch coupler for preventing the lock rom moving to the tool pin releasing position in a fully extended position of a mechanical hoe arm.

15. The quick hitch coupler of claim 3, wherein the latching member is slidably mounted on track means to guide linear movement of the latching member.

16. The quick hitch coupler of claim 15, wherein the latching member is provided by a latching hook having a latching hook main body with means for interacting with the track means.

17. The quick hitch coupler of claim 1, wherein the lock is operated hydraulically, pneumatically, electrically, electronically, wirelessly or by gravity.

* * * * *